United States Patent
Ramahi

(10) Patent No.: US 7,313,398 B1
(45) Date of Patent: Dec. 25, 2007

(54) SYSTEM AND METHOD FOR HANDOFF IN A CDMA NETWORK

(75) Inventor: Emad Ramahi, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 538 days.

(21) Appl. No.: 10/212,958

(22) Filed: Aug. 6, 2002

(51) Int. Cl.
*H04Q 7/20* (2006.01)

(52) U.S. Cl. .................. 455/436; 455/442; 455/452.2; 370/331; 370/329

(58) Field of Classification Search ................ 455/436, 455/442, 452.2, 703, 150.1, 154.1, 161.1; 370/331, 329
See application file for complete search history.

(56) References Cited

U.S. PATENT DOCUMENTS

| | | | |
|---|---|---|---|
| 6,175,561 B1 * | 1/2001 | Storm et al. ................ | 370/342 |
| 6,181,943 B1 * | 1/2001 | Kuo et al. .................. | 455/437 |
| 6,195,551 B1 * | 2/2001 | Kim et al. ................... | 455/436 |
| 6,208,873 B1 * | 3/2001 | Black et al. ................. | 455/522 |
| 6,563,807 B1 * | 5/2003 | Kim et al. ................... | 370/331 |
| 6,611,507 B1 * | 8/2003 | Hottinen et al. ............ | 370/331 |
| 6,724,808 B1 * | 4/2004 | Ohshima ..................... | 375/147 |
| 6,728,528 B1 * | 4/2004 | Loke .......................... | 455/318 |
| 6,735,432 B1 * | 5/2004 | Jarett et al. ................. | 455/417 |
| 6,810,254 B2 * | 10/2004 | Tiedemann et al. ......... | 455/437 |
| 2002/0090965 A1 * | 7/2002 | Chen et al. | |
| 2003/0058828 A1 * | 3/2003 | Sarkar et al. ............... | 370/342 |

* cited by examiner

*Primary Examiner*—Nghi H. Ly

(57) ABSTRACT

A system, method, and device for a soft-hard handoff within a wireless telecommunications network are provided. The network may include a mobile station using a first carrier frequency for communication with a base transceiver station (BTS). The BTS may send a carrier frequency list to the mobile station that includes one or more carrier frequencies. The mobile station may include a carrier frequency searcher (CFS) that searches across the carrier frequencies to find a pilot signal having a strength greater than a threshold value. The mobile station may perform a soft-hard handoff by tuning itself to a second carrier frequency associated with the pilot signal. Subsequent communications involving the mobile station may use the second carrier frequency.

7 Claims, 5 Drawing Sheets

SYSTEM AND METHOD FOR HANDOFF IN A CDMA NETWORK

FIELD OF THE INVENTION

The present invention relates to a system and method for a wireless telecommunications network. More specifically, the present invention relates to a system and method for a handoff that involves different carrier frequencies and is carried out in a wireless telecommunications network.

BACKGROUND OF THE INVENTION

In a typical wireless telecommunications network, a "softer handoff" may be performed when a mobile station switches to a different sector of the same base transceiver station (BTS) that it is currently using. Furthermore, a "soft handoff" may be performed if the mobile station switches to a different sector of a different BTS than it is currently using. During soft and softer handoffs, the new sector that the mobile station uses may employ the same carrier frequency as the previous sector. Thus, the mobile station may use the same carrier frequency for communications after the handoff.

A problem may arise, however, if a new sector does not employ the same carrier frequency as the sector from which the mobile station came. This often occurs, for instance, when a mobile station moves from a city area into a rural area where fewer carriers are provided. Additionally, a problem may arise if an assigned frame selector (e.g., identification value) for a call changes, which may occur when a mobile station moves from one market to another (e.g., the mobile station connects to a different mobile switching center (MSC)).

Prior art systems have typically used "hard handoff" techniques as solutions to these problems. Examples of typical hard handoff techniques include Pilot Beacon Hard Handoff, Round Trip Delay Hard Handoff, Hard Handoff based on Frame Error Rate (FER), Data based Assisted Hard Handoff (DAHO), and Non Pilot Assisted Directed Frequency Hand Over.

In hard handoff techniques such as these, a call is broken before a new connection that uses a different carrier frequency is made. Although the new connection is preferably made quickly (i.e., before the call disconnects or is noticeably disrupted), these hard handoff techniques may face a number of drawbacks. First, such hard handoff techniques may require network vendor specific solutions and the coupling of disparate vendor systems. Thus, these techniques may be relatively expensive and difficult to integrate. Furthermore, hard handoff techniques may require additional hardware having a complicated setup. In addition, the very nature of hard handoffs (i.e., breaking a connection before making a new one) typically causes such systems to have low reliability and a relatively high call drop rate.

SUMMARY

The present embodiments can be arranged to solve the foregoing problems and to help optimize situations that would otherwise use hard handoffs. In an aspect of an exemplary embodiment, a mobile station may include a carrier frequency searcher. The carrier frequency searcher may select a second carrier frequency while the mobile station communicates with a base transceiver station at a first carrier frequency. The carrier frequency searcher may also find a pilot signal at the second carrier frequency having a strength greater than a threshold value.

In another aspect of the present embodiment, a handoff method may be provided for a mobile station that communicates with a base transceiver station at a first carrier frequency. The method may include selecting a second carrier frequency from a carrier frequency list and scanning the second carrier frequency for a pilot signal. Additionally, the method may include comparing a strength of the pilot signal to a threshold value. Furthermore, the method may include performing a handoff by tuning the mobile station to the second carrier frequency if the strength of the pilot signal is greater than the threshold value.

In yet another aspect of the present embodiment, a mobile station may include a rake receiver locked on to a first pilot signal at a first carrier frequency. Additionally, the mobile station may include a rake receiver searcher in communication with the rake receiver. The rake receiver searcher may search at the first carrier frequency for a second pilot signal having a strength greater than a first threshold value. Furthermore, the mobile station may include a carrier frequency searcher in communication with the rake receiver and the rake receiver searcher. The carrier frequency searcher may search at multiple carrier frequencies for a third pilot signal having a strength greater than a second threshold value.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION

I. Exemplary Soft-Hard Handoff

In an exemplary embodiment, a person may use a mobile station, such as a cellular phone, to engage in a call at a first carrier frequency with another telecommunications device (e.g., cellular phone, landline phone, computing device, etc.) within a wireless telecommunications network. The mobile station may use any number of sectors of BTSs within the network for completing the call. As the mobile station moves within the network, or conditions within the network change (e.g., a currently-used sector's signal strength changes), the mobile station may obtain a better signal by changing the sector that it uses for transmitting the call. If nearby sectors do not use the first carrier frequency, the mobile station may switch to a second carrier frequency (corresponding to a different sector) while the call is still in session in order to obtain a better signal.

To facilitate switching carrier frequencies, the mobile station may include a carrier frequency searcher (CFS) that searches across multiple carrier frequencies while the call is in session. A BTS may activate the CFS and send a list of different carrier frequencies to the mobile station. The CFS may then search for a pilot signal at the different carrier frequencies specified within the list. If the CFS finds a second carrier frequency having a pilot signal that is stronger than a threshold value, the mobile station may notify the BTS that a "better" carrier frequency has been found. A handoff may then be initiated that may be hereinafter referred to as a "soft-hard handoff" (SHH). After the SHH, the mobile station may use the second carrier frequency for its communications. Exemplary wireless telecommunications networks, mobile stations, and handoff methods for use in an SHH will be described shortly.

II. Exemplary Wireless Telecommunications Network

Figure 1:
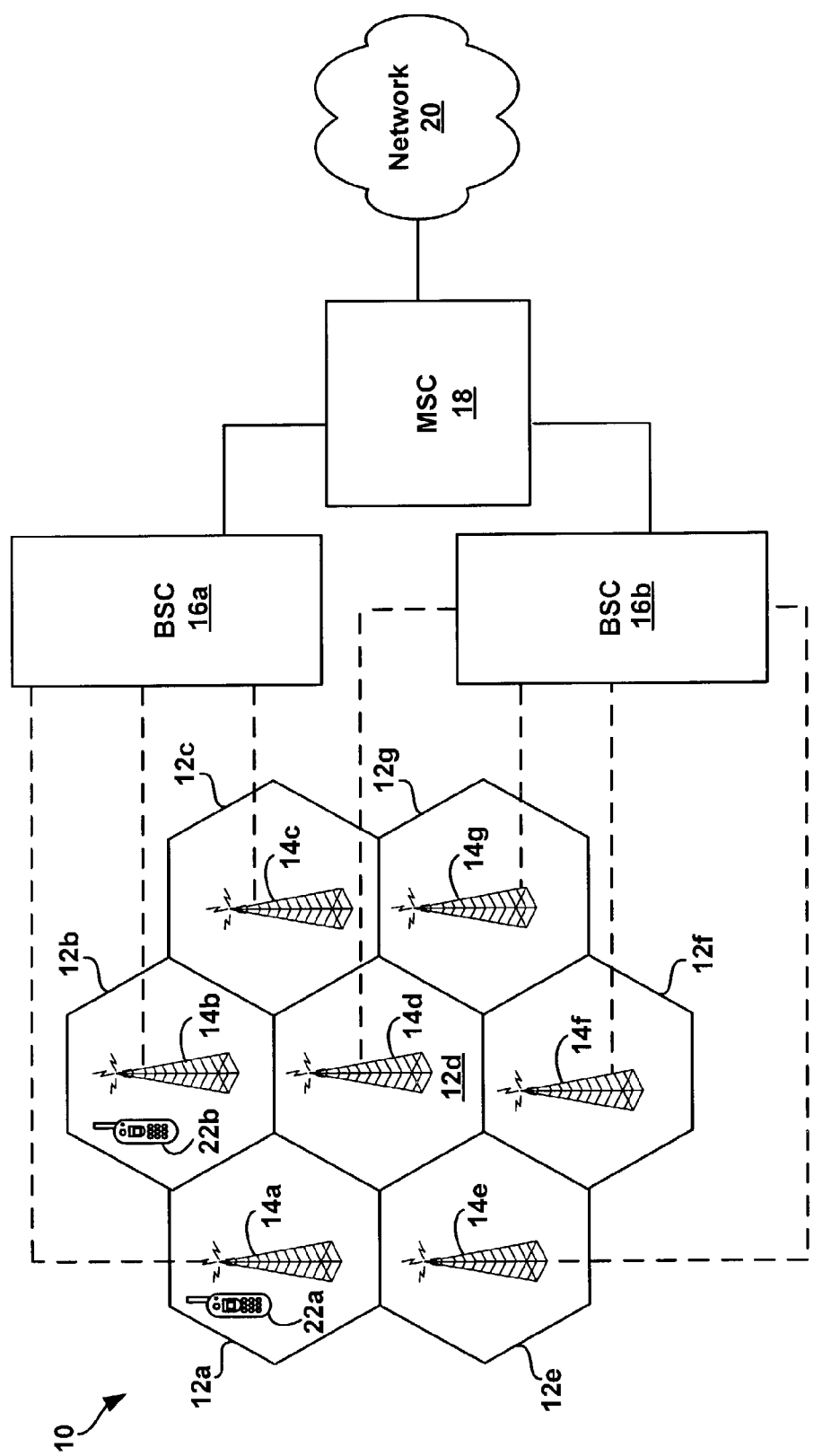
FIG. 1 shows an exemplary embodiment of a wireless telecommunications network.

Turning now to the drawings, FIG. 1 is a simplified block diagram that illustrates an exemplary wireless telecommunications network 10. In the present embodiment, the network 10 may use code-division multiple access (CDMA) technology, though other types of wireless technologies (e.g., time-division multiple access (TDMA), Global System for Mobile Communications (GSM), General Packet Radio Service (GPRS), Universal Mobile Telecommunications System (UMTS), 802.11, etc.) may also be used. Furthermore, the network 10 may include multiple cells 12a-g, each of which is defined by a radio frequency (RF) radiation pattern from a respective BTS 14a-g. FIG. 1 depicts each of the cells 12a-g in an idealized fashion, as hexagons that do not overlap. Alternatively, however, the cells 12a-g may overlap and vary widely in shape and size due to topography, signal strength, and other factors. Furthermore, it should be understood that the network 10 may have more or fewer cells in alternate embodiments.

In the network 10, each of the cells 12a-g may employ one or more carrier frequencies for communication with mobile stations within its boundaries. The number of carrier frequencies employed by a given cell may depend on various factors, such as the density of communication traffic expected in the site. In a congested city area, for example, a given cell may employ three or four carrier frequencies, while in a sparsely populated rural area, a cell may employ only one or two carrier frequencies.

In the network 10, the BTSs 14a-c may communicate with a base station controller (BSC) 16a. Similarly, the BTSs 14d-g may communicate with a BSC 16b. Each of the BSCs 16a-b in turn may communicate with an MSC or gateway 18. The MSC 18 may be located at a Central Office (CO) of a telephone company and may connect to another network 20, such as a Public Switched Telephone Network (PSTN) or the Internet. Additionally, or alternatively, any number of other intermediate elements may be used within the network 10.

Typically, a BSC for a cell manages the air interface between a BTS and a mobile station that is currently operating in the cell. For example, FIG. 1 depicts two such mobile stations 22a-b within cells 12a-b, respectively. Thus, in the present embodiment, the BSC 16a may control calls involving mobile stations 22a-b, respectively. As described previously, the BSC 16a may be controlled by the MSC 18.

Therefore, the MSC 18 may serve as a general control element for the network 10. The MSC 18 may perform a number of duties, such as setting up and switching calls to and from the cells 12a-g, providing for backup, interfacing with the telecommunications network 10, monitoring traffic to facilitate billing, performing testing and diagnostic services, and performing other network management functions. Additionally, the MSC 18 may assign a frame selector for each call passing through it, and the frame selector may be a unique identification value that identifies each call. The BSCs 16a-b, in turn, may be responsible for managing handoff of signaling and call traffic as a mobile station moves between cells 12a-g within the network 10. Additionally, the BSCs 16a-b may be responsible for controlling power levels and frequency allocation for the air interface between the BTSs (e.g., BTSs 14a-b) and the mobile stations (e.g., mobile stations 22a-b).

It should be understood that this and other arrangements described herein are illustrative only, and other arrangements and other elements (e.g., machines, interfaces, functions, etc.) can be used instead and some elements may be omitted altogether. Further, as in most telecommunications applications, those skilled in the art will appreciate that many of the elements described herein are functional entities that may be implemented as discrete components, in any suitable combination and location.

For example, although FIG. 1 depicts the BSCs 16a-b and the MSC 18 as separate entities, the functions of the BSCs 16a-b may be integrated into the MSC 18, thereby eliminating the separate BSC entities 16a-b. As another example, although FIG. 1 shows the BSCs 16a-b and BTSs 14a-g as separate entities, these two entities could be co-located or could otherwise be viewed cooperatively as a base station system (BSS). As still another example, while FIG. 1 shows the BTSs 14a-g grouped under the control of the two BSCs 16a-b, all of the BTSs 14a-g could instead be controlled by a common BSC. Further, as another example, the MSC or gateway 18 may instead be controlled by another entity, such as a session manager. Other arrangements are possible as well.

III. Exemplary Cells and Sectors

Figure 2:
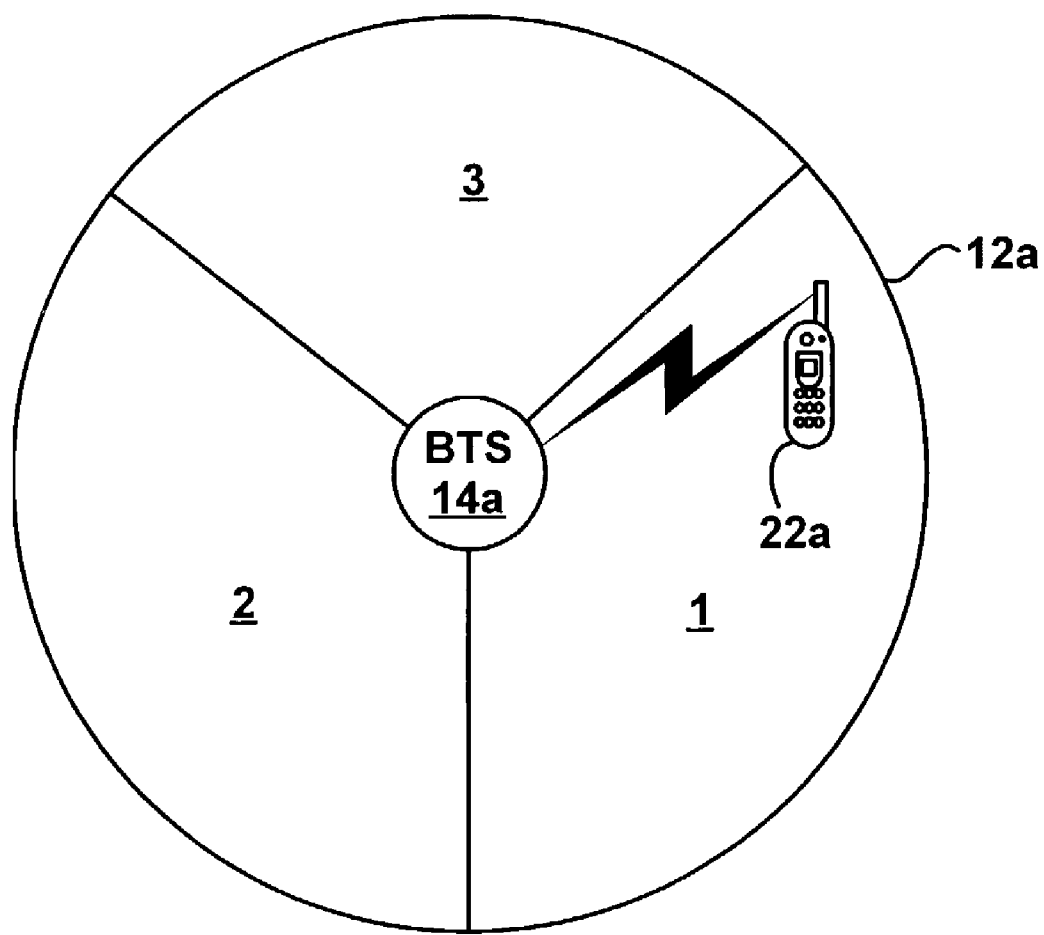
FIG. 2 shows an exemplary cell of the wireless telecommunications network of FIG. 1 in more detail.

Turning now to FIG. 2, the exemplary cell 12a is shown in greater detail, idealized as a circle. The cell 12a may include three sectors 1, 2, and 3, although the cell 12a may alternatively include more or fewer sectors. The three sectors may be referred to as physical sectors, since they are physical areas of the cell 12a. The physical sectors may be defined through the use of directional antenna elements from the BTS 14a located at the center of the cell 12a. Ideally, the physical sectors will be physically discrete areas, but there may be any amount of overlap between the sectors within a given cell. Additionally, as the mobile station 22a moves between physical sectors, the BSC 16a may be responsible for managing handoff of signaling and call traffic. It should be understood that although the cell 12a, base transceiver station 14a, and mobile station 22a are being discussed in the present embodiment, this description may apply to any number and type of cells, base transceiver stations, and mobile stations.

In the present embodiment, the mobile station 22a may maintain in its memory an "active" set of sectors with which it may communicate. Thus, when the mobile station 22a receives the same signal from each of the active sectors, it can decide on a frame-by-frame basis which is the best signal to use.

In addition, the mobile station 22a may maintain in its memory a list of "candidate" sectors. Candidate sectors are those sectors that are not yet in the active set but from which the mobile station 22a has received signals of sufficient strength to indicate that the mobile station 22a could demodulate signals from those sectors. Further, the mobile station 22a may maintain a list of "neighbor" sectors, which are those sectors that are not in the active set or candidate set but are in close vicinity to the mobile station 22a. All other possible pilots may be members of a "remaining" set. For more information on active, candidate, neighbor, and remaining sectors, one can refer to the industry standards IS-2000 (published in March 2000 as TIA/EIA/IS-2000-A) and IS-95, the contents of which are incorporated in its entirety herein by reference.

A. Exemplary Carrier Frequencies, Communication Channels, and PN Offsets

As mentioned previously, each of the cells 12a-g within the network 10 may employ one or more carrier frequencies for communicating with mobile stations that operate within its borders. In the present embodiment, the cell 12a may employ carrier frequencies "A", "B", "C", and "D". Furthermore, the BTS 14a may be arranged to communicate via each of these carrier frequencies within each of the physical sectors 1, 2, and 3. As a result, twelve separate combinations of frequency and sectors may exist in terms of communication traffic within the cell 12a (i.e., four possible frequencies for each of the three sectors).

Further, any number of mobile stations within the cell 12a may communicate concurrently with the BTS 14a on a given carrier frequency. For example, by using a unique set of "Walsh codes", up to 64 communication channels may be used on a given carrier frequency. In such an embodiment, the channels may include a pilot channel (Walsh code 0), a sync channel (Walsh code 32), a number of paging channels (Walsh codes 1 possibly through 7), and a number of traffic channels (any remaining Walsh codes).

Additionally, each physical sector within the cells 12a-g in the network 10 may be distinguished from adjacent sectors by a pilot signal having a pseudo-random number (PN) offset, which defines a sector-specific part of a pseudo-random number. For example, when the mobile station 22a is present in a given physical sector, communications between the mobile station 22a and the BTS 14a are generally encoded using the Walsh code of the channel and the PN offset of the sector, regardless of the carrier frequency being used. Details of the mechanics involved in this coding and communication are well known to those of ordinary skill in the art and are therefore not described here.

B. Exemplary Pilot Channel

In the present embodiment, the pilot channel may be used for establishing signal timing and conveying signal strength measurements to facilitate handoffs between sectors. Generally, the BTS 14a transmits the pilot channel at a power level higher than other signals sent to the mobile station 22a. Furthermore, the mobile station 22a may monitor the strength of pilot signals coming from sectors in the active set, candidate set, and neighbor set. The mobile station 22a may report the strongest pilot channels to the BTS 14a and/or BSC 16a. A network entity (such as the BSC 16a or the mobile station 22a itself) may then determine whether sectors within the candidate set and/or neighbor set have signal strengths high enough for serving the mobile station. The network entity may then determine whether to perform a soft or softer handoff to these sectors.

In addition, in potential soft-hard handoff situations (e.g., the mobile station 22a is near the edge of the cell 12a and the neighboring cells use different carriers), the mobile station 22a may access a carrier frequency list that indicates carrier frequencies that are used by neighboring sectors. As will be described shortly, the mobile station 22a may include a CFS that searches for pilot signals at the different carrier frequencies specified within the carrier frequency list. If the CFS finds a pilot signal that is strong enough ($E_c/I_o$, i.e., energy versus spectral density) and is at a different carrier frequency than the one currently used, the mobile station 22a may undergo an SHH to the new sector.

To facilitate the SHH, the BTS 14a may initially provide the mobile station 22a with a Handoff Direction Message (HDM), which indicates (i) the PN offsets of the sectors in the active set and (ii) the following handoff parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The mobile station 22a may then monitor the pilot signals that it receives and determine if any pilot signal corresponding to a neighboring sector exceeds T_ADD by T_COMP. If so, the mobile station 22a adds the pilot to its "candidate" set and sends a Pilot Strength Measurement Message (PSMM) to the BTS 14a, indicating the estimated strength of the pilot. Similarly, if the mobile station detects that the signal strength of a pilot in its active set drops below T_DROP, the mobile station may start a handoff drop timer. If T_TDROP passes, the mobile station 22a may then send a PSMM to the base station, indicating the strength of the pilot and the drop timer. For more information on PSMMs and pilot signal strength, one can refer to the previously incorporated IS-2000.

C. Exemplary Sync and Paging Channels

The sync channel may convey system identification and other system-specific information to mobile stations, to allow mobile stations to establish communication in the sector. The paging channels may page the mobile station 22a in order to determine whether the mobile station 22a is available to receive a call. Further the paging channels may carry system information and call setup orders to facilitate establishment of calls with the mobile station 22a.

D. Exemplary Operation of the Mobile Station

When the mobile station 22a is located in a given physical sector but is not engaged in a call (i.e., a call is not currently set up between the mobile station 22a and another terminal), the mobile station 22a is considered to be idle. In the idle mode, the mobile station 22a will monitor the paging channel(s) of the sector in which it is located, and the BTS 14a of the sector can send signals to the mobile station 22a via the paging channel(s). In contrast, when the mobile station 22a is engaged in a call, the mobile station 22a is considered to be active. In the active mode, the mobile station 22a is locked onto a traffic channel assigned by the BTS 14a. Accordingly, the mobile station 22a may receive signals from the BTS 14a via the traffic channel.

IV. Exemplary Receiver Component

Figure 3:
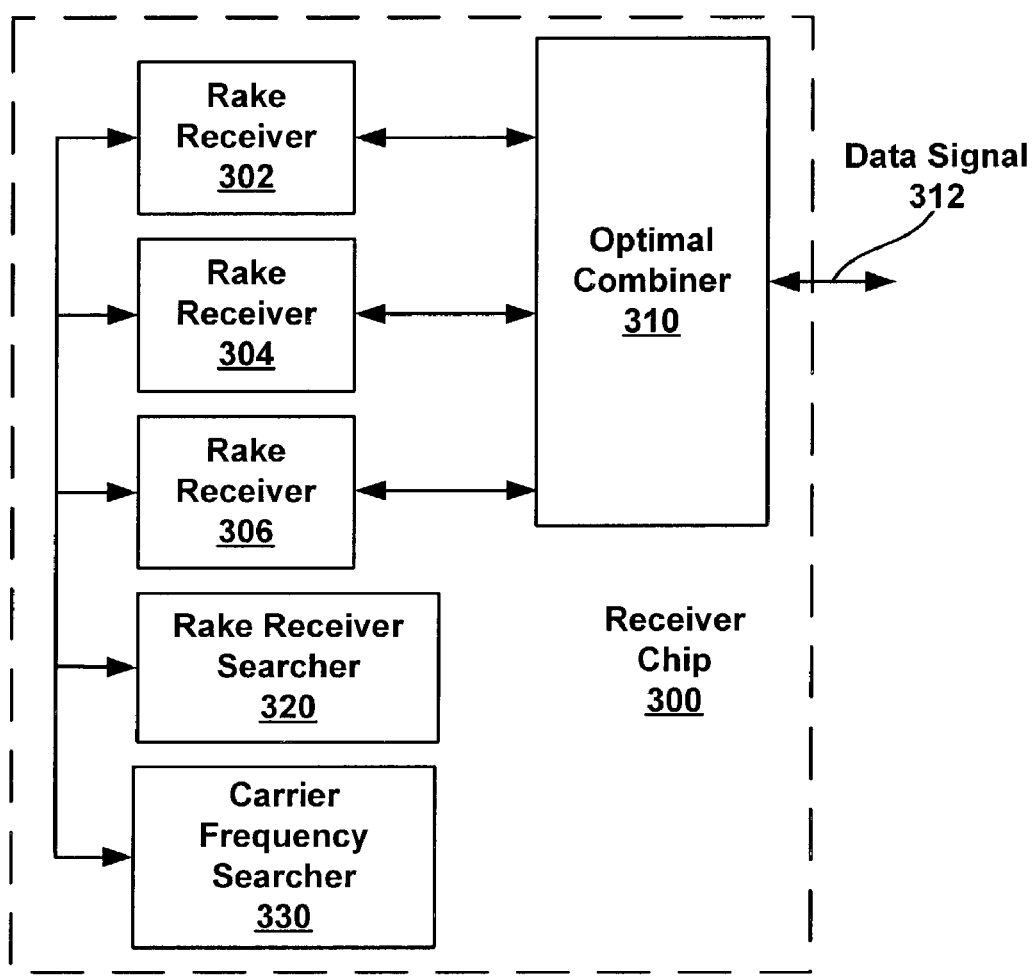
FIG. 3 shows an exemplary receiver component within a mobile station for use in the wireless telecommunications network of FIG. 1.

Turning now to FIG. 3, an exemplary receiver component 300 for use in the mobile station 22a is shown. The receiver component 300 may include three rake receivers 302, 304, 306 that are in communication with an optimal combiner 310. The optimal combiner 310 may combine the outputs of the rake receivers 302-306 to provide a data signal 312. The data signal 312 may include data pertaining to a call and may be converted to audio and/or video signals that are presented to a user. The component 300 may also include a rake receiver searcher (RRS) 320 and a carrier frequency searcher (CFS) 330 that are in communication with the rake receivers 302-306.

In the present embodiment, the receiver component 300 may be a silicon chip, and the rake receivers 302, 304, 306, optimal combiner 310, RRS 320, and/or CFS 330 may be created within the chip using standard microfabrication techniques or other such methods. Alternatively, each of the devices 302-330 may be fabricated separately and connected to one another individually, or any of the devices 302-330 may be integrated together within a single device (e.g., the rake receivers 302-306 and the optimal combiner 310). In addition, the mobile station 22a may alternatively include any number of receiver components similar to the receiver component 300.

A. Exemplary Rake Receivers

The rake receivers 302-306 may be substantially similar to one another and may monitor the strength of a pilot signal at a given carrier frequency. More or fewer rake receivers may alternatively be used with the receiver component 300.

In an exemplary scenario, each of the rake receivers 302-206 may monitor the strength of a different pilot signal having a different PN offset. For example, the mobile station 22a may receive pilot signals from more than one sector at the same time (e.g., sectors 1 and 2 from cell 12a). In such a scenario, each of the rake receivers 302-306 may lock on to a different pilot signal corresponding to a different sector.

Alternatively, each of the rake receivers 302-306 may monitor the strength of different reflections of the same pilot signal. Since a pilot signal sent from the BTS 14a may be reflected and travel along a number of different paths before reaching the mobile station 22a, the mobile station 22a may receive a number of "multipath" reflections of the same pilot signal. Thus, the rake receivers 302-306 may lock on to these multipath signals. It should be understood that some rake receivers may lock on to multipath reflections of a single pilot signal while other rake receivers lock on to multiple pilot signals.

In either of these embodiments (e.g., rake receivers 302-306 monitor multiple pilot signals and/or multipath reflections of a single pilot signal), the signals received by the rake receivers 302-306 may be out-of-phase. Thus, as will be described shortly, the signals received by the rake receivers 302-306 may be time-shifted and summed, resulting in less interference and a stronger data signal 312 than if only one rake receiver were used.

Additionally, as the relative strength of a pilot signal or the location of the mobile station 22a changes, one or more of the rake receivers 302-306 may stop monitoring a pilot signal and begin monitoring a different pilot signal. When changing to a different pilot signal during a soft or softer handoff, the rake receivers 302-306 may change PN offsets, although the carrier frequency of the call remains the same. During a soft-hard handoff, however, both the PN offset and carrier frequency of the call may change.

B. Exemplary Optimal Combiner

In the present embodiment, the optimal combiner 310 may time-shift the outputs of the rake receivers 302-306 to put them in phase. The optimal combiner 310 may then sum the time-shifted outputs to generate the data signal 312. The data signal 312 may then undergo additional processing (e.g., demodulation and digital-to-analog decoding) to form an analog signal that the mobile device 22a plays back to a user.

C. Exemplary Rake Receiver Searcher

The RRS 320 may be a searching device that scans among all PN offsets at a single carrier frequency to find the strongest pilot signals ($E_c/I_o$, i.e., energy versus spectral density). If the RRS 320 finds spectral energy that indicates the presence of a pilot signal at a different PN offset than is currently being used, the RRS 320 may demodulate the pilot signal and compare the strength of the pilot signal to a threshold level. If the pilot signal strength exceeds the threshold level, the RRS 320 may report the pilot signal to the BTS 14a and in turn to the BSC 16a. The BSC 16a may then decide whether the mobile station 22a should perform a soft or softer handoff in order to employ the new PN offset.

By continually searching for a stronger pilot signal than the one(s) currently used by the rake receivers 302-304, the RRS 320 enables the mobile station 22a to use the strongest pilot signal(s) available at a given carrier frequency even as call parameters (e.g., location of the mobile device) change. Also, the RRS 320 may access a neighbor list indicating which sectors have signal strengths high enough for serving the mobile station 22a. The neighbor list may then be used when determining whether to perform soft or softer handoffs between sectors.

D. Exemplary Carrier Frequency Searcher

The CFS 330 may scan for pilot signals at multiple carrier frequencies. As will be described shortly, these carrier frequencies may be specified within a carrier frequency list that is sent from the BTS 14a to the mobile station 22a. Although the hardware for the CFS 330 may be similar to the RRS 320, the CFS 330 may scan for pilot signals at multiple carrier frequencies.

The CFS 330 may remain in a standby mode during normal operation of the mobile station 22a. If the BTS 14a, BSC 16a, or other unit within the network 10 detects that the mobile station 22a is in a potential SHH situation (e.g., the mobile station 22a is near the edge of the cell 12a and the neighboring cells use different carriers), then the BTS 14a may send a message to the mobile station 22a to activate the CFS 330. The BTS 14a may send additional messages that include the carrier frequency list. The CFS 330 may then search for pilot signals among different carrier frequencies specified within the list.

To illustrate an exemplary operation of the CFS 330, suppose that the mobile station 22a is using a carrier frequency "A" for a call. If the mobile station 22a is near another cell that only employs carrier frequencies "B", and "C", the mobile station 22a may be in a potential SHH situation. The BTS 14a may then activate the CFS 330 and specify a carrier frequency list that includes "B" and "C". The CFS 330 may then search the carrier frequencies "B" and/or "C" for pilot signals. If the pilot signal(s) found within the carrier frequencies "B" and/or "C" have a strength greater than a threshold level, (e.g., T_ADD or T_DROP), the mobile station 22a may perform a soft-hard handoff and begin using carrier frequencies "B" or "C" for the call. After the handoff, the rake receivers 302-306 may use these pilot signal(s) at carrier frequencies "B" or "C" for receiving the call.

It should be understood that the CFS 330 and the RRS 320 may alternatively be integrated within one searching device, or that more or fewer searching devices may be used with the component 300. For example, the mobile station 22a may search for pilot signals at multiple carrier frequencies simultaneously through the use of multiple CFSs. Furthermore, in an alternate embodiment, the CFS 330 may continually search for pilot signals at multiple carrier frequencies, and the list of carrier frequencies that are to be searched by the CFS 330 may be specified by the mobile station 22a itself.

V. Exemplary Messages for Use in a Soft-Hard Handoff

Figure 4:
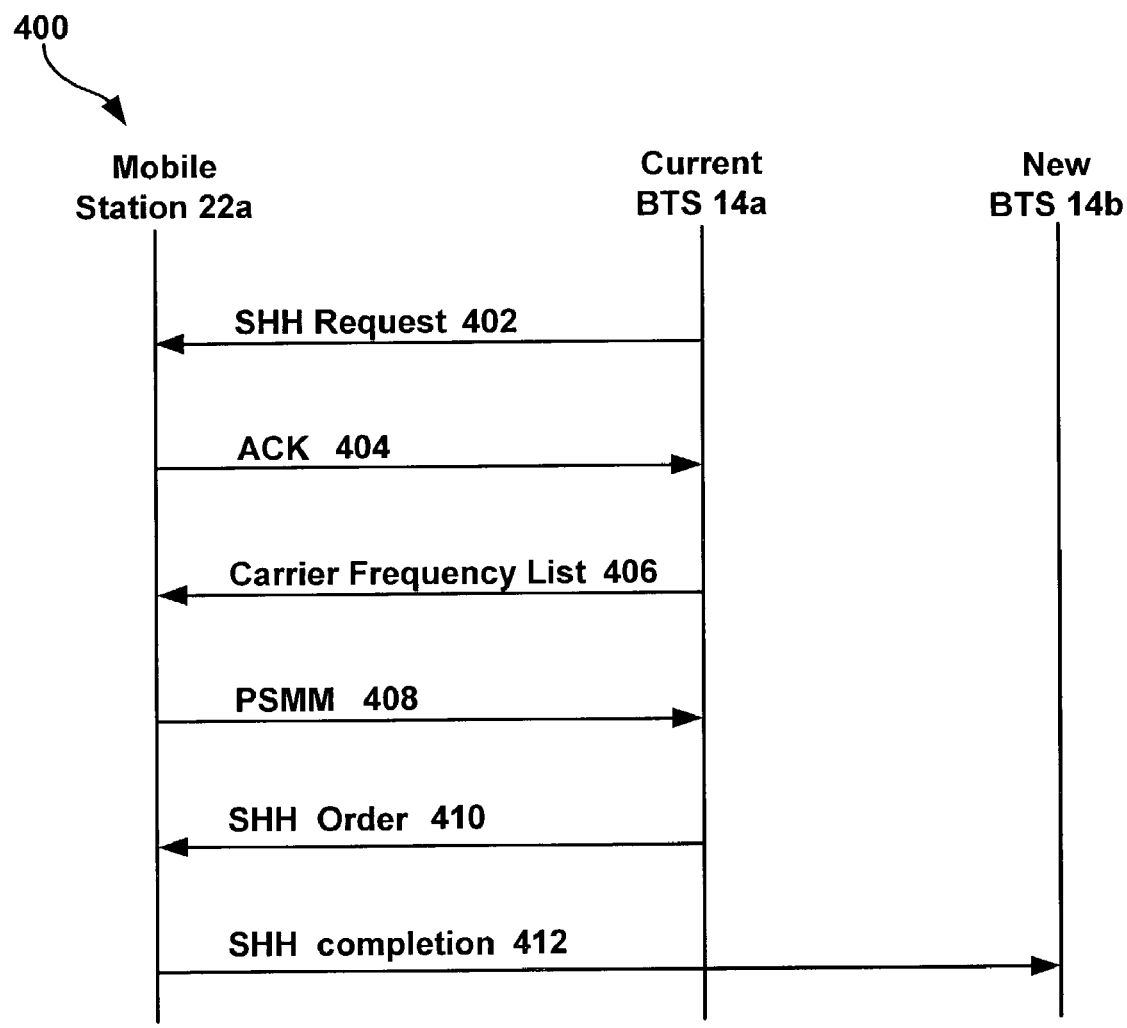
FIG. 4 shows exemplary messages for use in a soft-hard handoff that is carried out in the wireless telecommunications network of FIG. 1.

Turning now to FIG. 4, exemplary messages 400 are shown for use in a soft-hard handoff carried out in the network 10. The mobile station 22a and the BTSs 14a-b may send the messages 400 when the mobile station 22a is in a potential SHH situation, such as when the mobile station 22a is near the edge of the cell 12a and the neighboring cells use different carriers. The BTS 14a and/or BSC 16a may detect that the mobile station 22a is in a potential SHH situation by monitoring the location of the mobile station 22a, monitoring the strength of the pilot signal for the currently-used sector, and/or monitoring the strength of (pilot signals within) nearby sectors. It should be understood that various network components may identify potential SHH situations using other monitoring techniques as well.

In a potential SHH situation, the BTS 14a corresponding to the cell 12a may send an SHH request 402 via a paging channel to the mobile station 22a in order to activate the CFS 330. The mobile station 22a may respond with an acknowledgement message 404 to indicate that the SHH request 402 was received.

The BTS 14a may then send a carrier frequency list 406 to the mobile station 22a that lists the carrier frequencies used by neighboring BTSs (e.g., BTSs 14b,d,e in FIG. 1). Any number of different types of messages may include the carrier frequency list 406. For example, a general assignment message or an extended channel assignment message (ECAM) sent via a paging channel or traffic channel may include a list of carrier frequencies. The CFS 330 within the mobile station 22a may then search these carrier frequencies to find possible alternate carriers to be used by the mobile station 22a. Furthermore, it should be understood that additionally, or alternatively, the SHH request 402 and the carrier frequency list 406 may be combined within a single message, and the general assignment messages and ECAMs may be used for the SHH request 402 as well.

If the CFS 330 finds a carrier frequency having a pilot signal with a strength greater than a threshold level, the mobile station 22a may send a PSMM 408 along the paging channel to the BTS 14a. As described previously in this application, the PSMM 408 may include the estimated strength of the pilot signal. It should be understood that the mobile station 22a may send other messages instead of the PSMM 408, such as a flag that the mobile station 22a sets when an appropriate carrier frequency has been found.

After receiving the PSMM 408 or other such message, the BTS 14a may then send an SHH order 410 to the mobile station 22a to enable the soft-hard handoff to the new BTS (e.g., BTS 14b). The SHH order 410 may indicate the values for the new carrier frequency and pilot signal(s) for the call, The mobile station 22a may then complete the SHH and send an SHH completion message 412 to the new BTS (e.g., BTS 14b) to indicate that the SHH has been performed. Thus, the new BTS (e.g., BTS 14b) may now receive data sent between the mobile station 22a and the BSC 16a.

It should be understood that many other types of messages used in wireless cellular communications may additionally or alternatively be used during a soft-hard handoff. For example, various messages that may be specific to a soft handoff can be sent among the BTSs 14a, 14b and MSC 18 once the PSMM 410 is received in order to facilitate the SHH. Such messages may include handoff requests and orders, assignment of a frame selector, various acknowledgements and confirmations, establishment of a packet pipe (PP), and deactivation requests.

VI. Exemplary Method for Performing a Soft-Hard Handoff

Figure 5:
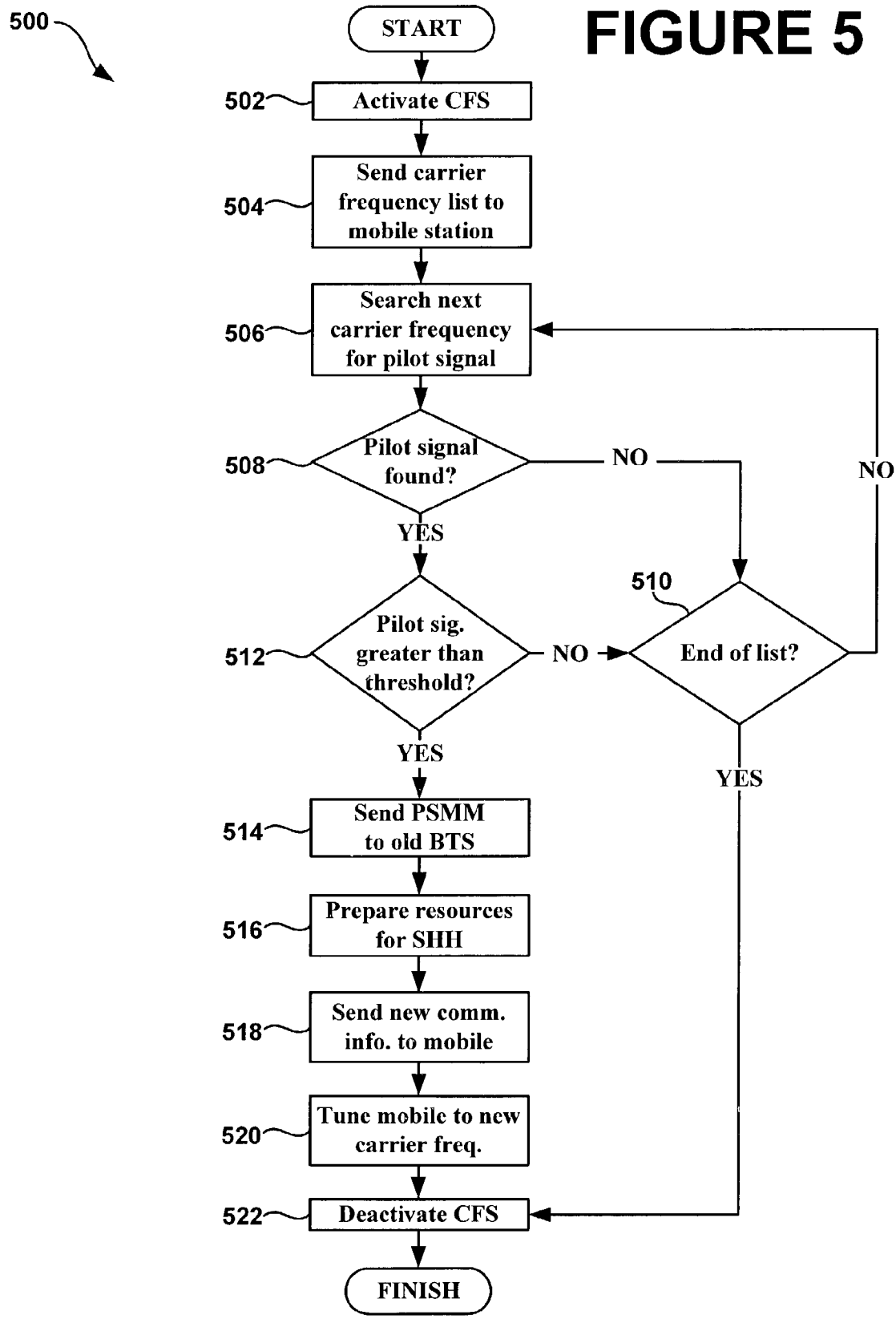
FIG. 5 shows an exemplary method of performing a soft-hard handoff in the wireless telecommunications network of FIG. 1.

Turning now to FIG. 5, an exemplary method 500 for use in a soft-hard handoff is shown. This method 500 may occur while the mobile station 22a communicates with the BTS 14a at a first carrier frequency. Furthermore, the mobile station 22a may be in a potential SHH situation. Therefore, in step 502, the BTS 14a may activate the CFS 330 by sending an SHH request to the mobile station 22a. The mobile station 22a may respond to the SHH request 402 with an acknowledgement message 404.

In step 504, the BTS 14a may send a list of carrier frequencies used by various sectors (e.g., sectors within the neighboring or candidate sets) via a carrier frequency list message 406. In step 506, the mobile station 22a may use the CFS 330 to search for a pilot signal among the list of carrier frequencies. The CFS 330 may begin by searching for a pilot signal at the first carrier frequency within the list. The list may be organized so that the carrier frequencies most likely to have a strong signal (e.g., corresponding to adjacent sectors or powerful sectors) are at the top of the list and are searched first. Alternatively, the CFS 330 may search the list in any order, and the carrier frequencies may be stored within the list in any pattern. Other types of data structures (e.g., tree, stack, etc.) may also store the carrier frequencies.

In step 508, the CFS 330 may determine whether it has found a pilot signal at the carrier frequency for which it is searching. If the CFS 330 has not found a pilot signal, the method 500 may proceed to step 510, where the CFS 330 may determine whether it has reached the end of the carrier frequency list. If the CFS 330 has reached the end of the list, then the method 500 may skip ahead to step 522, and the new BTS 14b and/or BSC 16a may deactivate the CFS 330. If the CFS 330 has not reached the end of the carrier frequency list, the method 500 may return to step 506, where the CFS 330 may search the next carrier frequency within the carrier frequency list.

Returning to the determination in step 508, if a pilot signal is found within the carrier frequency being searched, the method 500 may proceed to step 512. In step 512, the CFS 330 may determine whether the strength of the pilot signal exceeds a threshold value. In the present embodiment, the threshold value may be T_ADD or T_DROP, though any desired value may be used. For example, the threshold value may alternatively be the strength level of the pilot signal(s) currently used by the mobile station 22a.

If the strength of the pilot signal does not exceed the threshold value, the method may proceed to step 510. As described previously, the CFS 330 may determine in step 510 whether it has reached the end of the carrier frequency list.

Returning to the determination in step 512, if the strength of the pilot signal is greater than the threshold value, the method 500 may proceed to step 514, where the mobile station sends a PSMM 408 to the current BTS 14a. In step 516, the BTSs 14a-b, the BSC 16a, and/or the MSC 18 may prepare air interface resources for the soft-hard handoff. Step 516 may be substantially similar to conventional steps in soft and softer handoffs that are used for setting up traffic channels.

In the following step 518, the BTS 14a may send the new communication information (e.g., SHH order 410 specifying the new carrier frequency and pilot signal(s)) to the mobile station 22a. In step 520, the mobile station 22a may perform an SHH by tuning the rake receivers 302-306 to the new carrier frequency. Further, in step 522, the mobile station 22a may deactivate the CFS 330 after the SHH has been completed.

Thus, as shown in FIG. 5, the method 500 may terminate in a number of different ways. For example, the CFS 330 may find no pilot signals at the carrier frequencies specified within the carrier frequency list. Alternatively, the CFS 330 may find a pilot signal that is too weak and has a strength that does not exceed the threshold value. In yet another alternative, the CFS 330 may find a pilot signal whose strength exceeds the threshold value, and an SHH may be performed.

The wireless telecommunications system 10 presented in the exemplary embodiments may have numerous advantages. First, by using a soft-hard handoff, a connection to a new BTS may be made before the connection to an old BTS is broken, making such handoffs more reliable. Furthermore, SHHs may enable networks to handle typical hard handoff situations without the use of network vendor specific solutions or the coupling of disparate vendor systems. Furthermore, additional hardware and/or software components (e.g., the CFS 330) may be incorporated within a mobile station at a relatively minimal cost.

It should be understood that a wide variety of changes and modifications may be made to the embodiments of the wireless telecommunications network 10 described above. For example, any number of other messages may be sent among the BTSs 14a-b and the MSC 18 during an SHH, such as handoff requests and orders, assignment of a frame selector, various acknowledgements and confirmations, establishment of a packet pipe (PP), and deactivation requests. Furthermore, the BTS 14a may alternatively activate the CFS 330 when the BTS 14a sends the carrier frequency list message 406 instead of the SHH request 402 to the mobile station 22a. Additionally, certain components, functions, and operations of the network 10 of the present embodiments may be accomplished with hardware, software, or a combination of the two. It is therefore intended that the foregoing description illustrates rather than limits this invention, and that it is the following claims, including all equivalents, that define this invention:

What is claimed is:

1. A handoff method for a mobile station communicating with a base transceiver station at a first carrier frequency, the handoff method comprising:

receiving into the mobile station a first message from the base transceiver station to activate a carrier frequency searcher in the mobile station, wherein the first message is sent to the mobile station in response to the mobile station being in a potential soft-hard handoff situation;

receiving into the mobile station a second message from the base transceiver station, the second message providing the mobile station with a carrier frequency list;

responsive to receipt of the first message, the mobile station (i) selecting a second carrier frequency from the carrier frequency list, (ii) scanning the second carrier frequency for a pilot signal, (iii) comparing a strength of the pilot signal to a threshold value, and (iv) performing a handoff by tuning the mobile station to the second carrier frequency if the strength of the pilot signal is greater than the threshold value, wherein the mobile station communicates with the base transceiver station at the first carrier frequency while performing the steps of selecting the second carrier frequency, scanning the second carrier frequency, comparing the strength of the pilot signal to the threshold value, and performing the handoff.

2. The handoff method of claim 1 further comprising sending the carrier frequency list in the second message from the base transceiver station to the mobile station.

3. The handoff method of claim 1 further comprising selecting a third carrier frequency from the carrier frequency list if the pilot signal is not found within the second carrier frequency.

4. The handoff method of claim 1 further comprising scanning the second carrier frequency for a second pilot signal if the strength of the pilot signal is less than the threshold value.

5. The handoff method of claim 1, wherein the carrier frequency list comprises multiple carrier frequencies used by neighboring sectors.

6. The handoff method of claim 1, wherein the step of performing the handoff further comprises communicating between the mobile station and a second base transceiver station using the second carrier frequency.

7. The handoff method of claim 1 further comprising notifying at least one of the base station controller and a mobile switching center if the strength of the pilot signal is greater than the threshold value.

* * * * *